United States Patent Office 2,786,767
Patented Mar. 26, 1957

2,786,767

FIXED FLAVORS AND METHOD OF PRODUCING THE SAME

Leo J. Novak, Dayton, Ohio, assignor, by mesne assignments, to Midland Chemical Corporation, Dayton, Ohio, a corporation of Delaware No Drawing. Application November 5, 1954,
Serial No. 467,241

12 Claims. (Cl. 99—140)

This invention relates to gelatin-fixed flavors having improved keeping quality or shelf life. More particularly it relates to gelatin-fixed citrus oils.

Oils extracted from citrus fruits, for example, orange, lemon and lime oils are widely used as flavoring aids but have the inherent disadvantage of marked susceptibility to deterioration by oxidation. For the most part, these oils, after having been expressed from the fruit, develop off-flavors if stored even for comparatively short periods of time, these off-flavors apparently resulting from oxidation and consequent decomposition of terpenes, especially limonene, into aldehydes and ketones.

The oils are often fixed in gelatin to provide gelatin-fixed flavors for use in preparing puddings, pie fillings and so on. These gelatin-fixed products are prepared by emulsifying the volatile water-miscible flavoring materials in a gelatin solution, after which the solution is jelled and dried to about 9–11% moisture and ground. Each particle contains numerous droplets of flavoring material encapsulated by the gelatin and the gelatin-encased or fixed flavors may be introduced into any product to be flavored in any appropriate amount.

Considerable difficulty is experienced with these gelatin-fixed flavors due to the fact that the gelatin becomes insoluble and off-flavors develop. The aldehydic flavor components tan the gelatin and result in a partially tanned gelatin without flavor potency. The formation of insoluble gelatin decreases the value of the products and often renders them entirely unuseable. In the case of gelatin puddings the insoluble products are visible and unsightly in the prepared dessert. In commercial bakeries the fixed flavors are often used in the form of a gelatin slab, a specified portion of the slab containing a specified portion of flavoring material, and any variation in the amount of available flavor is undesirable. If the gelatin fixer becomes insoluble, the flavor is not uniformly available even if it was uniformly mixed with the gelatin initially. Insolubility of the gelatin will generally result in localization of the flavor which makes it impossible for the baker to produce a batch of uniformly flavored baked goods.

Products in which the gelatin becomes insoluble and which develop off-flavors present many distribution problems, and there is a large waste incidental to discarding the degraded products.

The object of the present invention is to provide gelatin-fixed citrus oils the gelatin component of which does not become insoluble on standing for prolonged periods of time and which do not tend to develop off-flavors.

In accordance with the invention, the improved gelatin-fixed flavors are obtained by including a small amount, from 0.05% to 1.0% of carboxymethyl dextran in the gelatin solution before the citrus oils are mixed therewith.

The carboxymethyl dextran may be obtained by acting on the selected dextran with a carboxymethylating agent in an aqueous alkaline medium, whereby the carboxymethyl group is substituted for one or more hydroxyl groups in the dextran molecule, with production of an ether. Suitable carboxymethylating agents are chloracetic acid, sodium chloracetate or chloracetamide. The reaction thereof with the dextran is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for a time ranging from about ten minutes to two hours. Preferably, also, the molar ratio of sodium chloracetate or potassium chloracetate to dextran is between 2:1 and 12:1, the molar ratio of sodium or potassium hydroxide to dextran is between 5:1 and 15:1, and the molar ratio of the water to dextran is between 70:1 and 120:1. The ethers obtained have a D. S. (degree of substitution or average number of carboxymethyl groups per anhydroglucopyranosidic unit) of about 0.2 to 3.0.

The reaction product is a viscous mass comprising the sodium or potassium salt of the dextran ether, from which the salt may be precipitated by means of a water-miscible alcohol, e. g., methyl, ethyl, propyl, isopropyl or t-butyl or a ketone such as acetone.

The free ether may be recovered from the salt by mixing the latter with water, acidifying to a pH of about 2.0, and precipitating the carboxymethyl dextran from the acid medium by addition of an aliphatic water-miscible alcohol or ketone. Precipitation of the ether at pH 2.0 is not critical, as other acid pH values may be used, but the highest yields of the ether have been obtained by precipitation at pH 2.0.

The dextran reacted with the carboxymethylating agent may be obtained in various ways. It may be biosynthesized from sucrose by microorganisms of the Leuconostoc mesenteroides and L. dextranicum types, or their enzymes. Microorganisms (or their enzymes) which may be used include those bearing the following NRRL (Northern Regional Research Laboratory) designations: Leuconostoc mesenteroides B–512, B–119, B–1146, B–1190, B–742, B–1191, B–1196, B–1208, B–1216, B–1120, B–1144, B–523; Streptobacterium dextranicum B–1254 and Betabacterium vermiforme B–1139.

The procedure is to inoculate the culture of the microorganism, or the enzyme filtered from the culture, into an aqueous sucrose-bearing nutrient medium, incubate the mass until the dextran is produced in maximum yield, and precipitate the dextran from the fermantate by the addition of a water-miscible aliphatic alcohol or ketone to it. The dextran thus obtained is reduced to a fine powder for conversion to the carboxymethyl ether. This "native" dextran normally has a very high molecular weight which has been calculated to be in the millions. It may be converted to the ether at the native high molecular weight or after partial hydrolysis to a product of lower molecular weight. In general, the dextran may have a molecular weight of 5000 to $150 \times 10^6$ determined by light scattering measurements.

As noted, the carboxymethyl dextrans are effective in small quantities as stabilizing and protecting agents for the gelatin-fixed flavors. As little as 0.05% of carboxymethyl dextran as described herein will effectively prevent insolubilization of the gelatin in a gelatin-fixed orange oil-flavored product for a period of many months, while larger amounts, such as 0.1% will protect the product for about a year. Five-fold lime oil fixed in gelatin normally deteriorates noticeably, with insolubilization of the gelatin, in a period of about two months. However, if 0.5% of carboxymethyl dextran is mixed with the gelatin solution containing the lime citrus oil, the deterioration is greatly delayed, and after many months the flavor is as fresh as when the sample was prepared. The same results are obtained with orange oil, and the results are independent of whether or not the oil is concentrated or of single strength. If freshly pressed single strength lemon oil is fixed in gelatin without the addition of carboxymethyl dextran, the gelatin becomes insoluble and off-flavors develop within about four months. If, however, 0.5% of a carboxymethyl dextran is mixed into the gelatin solution before the lemon oil is added, the product retains its freshness for a long time.

As noted the carboxymethyl dextran may be derived from a dextran of molecular weight between 5000 and $150 \times 10^6$ determined by light scattering measurements and may contain an average of from 0.2 to 3.0 carboxymethyl groups per anhydroglucopyranosidic unit of the dextran. However, it may be preferred to use a carboxymethyl ether of a native, high molecular weight, microbiologically produced dextran, such as native L. m. B-512 dextran, containing an average of 2.0 to 3.0, specifically 2.8, carboxymethyl groups per anhydroglucopyranosidic unit of the dextran.

Since variations of the examples given will be readily apparent to those skilled in the art and may be practiced without departing from the spirit and scope of the invention, it is to be understood that it is not intended to limit the invention except as defined in the appended claims.

What is claimed is:

1. A gelatin product having from 0.05% to 1.0% by weight of carboxymethyl dextran and having a citrus oil dispersed therein, the product being characterized in that the carboxymethyl dextran protects the gelatin against insolubilization for indefinite periods of time.

2. A gelatin product having from 0.05% to 1.0% of carboxymethyl dextran and having orange oil dispersed therein, the product being characterized in that the carboxymethyl dextran protects the gelatin against insolubilization for indefinite periods of time.

3. A gelatin product having from 0.05% to 1.0% of carboxymethyl dextran and having lemon oil dispersed therein, the product being characterized in that the carboxymethyl dextran protects the gelatin against insolubilization for indefinite periods of time.

4. A gelatin product having from 0.05% to 1.0% of carboxymethyl dextran and having lime oil dispersed therein, the product being characterized in that the carboxymethyl dextran protects the gelatin against insolubilization for indefinite periods of time.

5. A gelatin product having from 0.05% to 1.0% by weight of a carboxymethyl ether of a native, high molecular weight, microbiologically produced dextran containing an average of 2.0 to 3.0 carboxymethyl groups per anhydroglucopyranosidic unit and having a citrus oil dispersed therein, the product being characterized in that the carboxymethyl dextran protects the gelatin against insolubilization for indefinite periods of time.

6. A gelatin product having from 0.05% to 1.0% by weight of a carboxymethyl ether of a native, high molecular weight, microbiologically produced dextran containing an average of 2.0 to 3.0 carboxymethyl groups per anhydroglucopyranosidic unit and having orange oil dispersed therein, the product being characterized in that the carboxymethyl dextran protects the gelatin against insolubilization for indefinite periods of time.

7. A gelatin product having from 0.05% to 1.0% by weight of a carboxymethyl ether of a native, high molecular weight, microbiologically produced dextran containing an average of 2.0 to 3.0 carboxymethyl groups per anhydroglucopyranosidic unit and having lemon oil dispersed therein, the product being characterized in that the carboxymethyl dextran protects the gelatin against insolubilization for indefinite periods of time.

8. A gelatin product having from 0.05% to 1.0% by weight of a carboxymethyl ether of a native, high molecular weight, microbiologically produced dextran containing an average of 2.0 to 3.0 carboxymethyl groups per anhydroglucopyranosidic unit and having lime oil dispersed therein, the product being characterized in that the carboxymethyl dextran protects the gelatin against insolubilization for indefinite periods of time.

9. A process for producing stable gelatin-fixed citrus oils and stabilizing the gelatin against insolubilization for indefinite periods of time which comprises dissolving from 0.05% to 1.0% of carboxymethyl dextran in an aqueous solution of gelatin, and dispersing the citrus oil in the resulting solution.

10. A process for producing stable gelatin-fixed orange oil and stabilizing the gelatin against insolubilization for indefinite periods of time which comprises dissolving from 0.05% to 1.0% of carboxymethyl dextran in an aqueous solution of gelatin, and dispersing the orange oil in the resulting solution.

11. A process for producing stable gelatin-fixed lemon oil and stabilizing the gelatin against insolubilization for indefinite periods of time which comprises dissolving from 0.05% to 1.0% of carboxymethyl dextran in an aqueous solution of gelatin, and dispersing the lemon oil in the resulting solution.

12. A process for producing stable gelatin-fixed lime oil and stabilizing the gelatin against insolubilization for indefinite periods of time which comprises dissolving from 0.05% to 1.0% of carboxymethyl dextran in an aqueous solution of gelatin, and dispersing the lime oil in the resulting solution.

References Cited in the file of this patent
UNITED STATES PATENTS

| Number | Name | Date |
| --- | --- | --- |
| 2,089,217 | Mahoney | Aug. 10, 1937 |
| 2,224,167 | Stokes et al. | Dec. 10, 1940 |
| 2,369,847 | Olsen et al. | Feb. 10, 1945 |
| 2,409,816 | Wadsworth et al. | Oct. 22, 1946 |
| 2,609,368 | Gaver | Sept. 2, 1952 |